Aug. 13, 1957     B. M. RONAY     2,802,930

ALLOY CAST IRON ARC-OXYGEN CUTTING ELECTRODE

Filed April 25, 1955

INVENTOR.
BELA M. RONAY
BY Wilson R. Maltby
George Sipkin
ATTORNEYS

United States Patent Office 2,802,930
Patented Aug. 13, 1957

2,802,930
ALLOY CAST IRON ARC-OXYGEN CUTTING ELECTRODE

Bela M. Ronay, Annapolis, Md.

Application April 25, 1955, Serial No. 503,841

11 Claims. (Cl. 219—70)

(Granted under Title 35, U. S. Code (1952), sec. 266)

The invention described herein may be manufactured and used by or for the Government of the United States of America for governmental purposes without the payment of any royalties thereon or therefor.

The present application is a continuation-in-part of application Serial No. 274,991, filed March 5, 1952, under the same title, which earlier application has been permitted to become abandoned in favor of the instant application.

This invention relates to an electrode for electric arc cutting wherein oxygen or other reactant gas is passed through the electrode.

In electric arc cutting of metals, it is desirable to provide oxygen at the arc to accelerate oxidation of the material, the gas being passed axially through the electrode to the vicinity of the arc. This technique is referred to as the arc-oxygen method. In this method, the arc is established between the metal work to be cut and the cutting electrode. A portion of the work is directly exposed to the arc and is heated to a state of incandescence. This portion is also exposed to the oxygen stream issuing from the bore of the electrode and oxidizes rapidly. The energy and force of the oxygen stream ejects the products of oxidation so that a cut is completed.

Various electrodes have been used in an attempt to make the arc-oxygen cutting method successful for underwater use and other uses where ordinary metal removing techniques are inefficient or impracticable. For example, steel tubes have been tried with some success for cutting thin sheet metal. However, steel is not satisfactory as a cutting electrode for underwater use because its life is extremely short, and its total mass or length consumed in use equals or exceeds the mass of materials removed from the target or work. In some instances as much as ten inches of electrode are consumed for a single inch of useful cut, and the method becomes impracticable because of the cost and the delay occasioned by electrode replacement.

A second type of electrode is described in applicant's related case, Serial Number 725,177, filed January 30, 1947, entitled Electrode for Underwater Cutting. This application is now U. S. Patent No. 2,640,136, dated May 26, 1953. The electrode described therein comprises a tubular structure of silicon carbide surrounded by a metallic shroud of metal in intimate contact and supporting relation therewith. This electrode is quite satisfactory for underwater cutting, but has a very high cost.

Other electrodes have been tried at various times but have been found inefficient or inoperative for the purpose of underwater cutting, each being subject to one or more objections.

The manufacture of a tubular underwater cutting electrode which necessarily has a heavy wall and a relatively small bore presents considerable difficulty. This is particularly true when the electrode material is a ceramic or an alloy which is too hard to machine or bore. Furthermore, the silicon carbide type of electrode is usually not available in the open market, and can be obtained only under very costly and time-consuming circumstances.

It is therefore an object of this invention to provide an electrode which can be quickly and inexpensively manufactured by a number of manufacturers.

Another object of this invention is to provide a substitute material for the shrouded silicon carbide underwater cutting electrode which is not subject to thermal fracture and loss of electrode material characteristic of the silicon carbide electrode.

It is a further object of this invention to provide an alloy electrode of cast iron alloy with alloy materials which form a refractory slag which protects the exterior of the arc and which extends beyond the unmelted portion of the alloy during operation to retard the melting rate thereof.

Other objects and many of the attendant advantages of this invention will be readily appreciated as the same becomes better understood by reference to the following detailed description when considered in connection with the accompanying drawings wherein.

Figure 1:
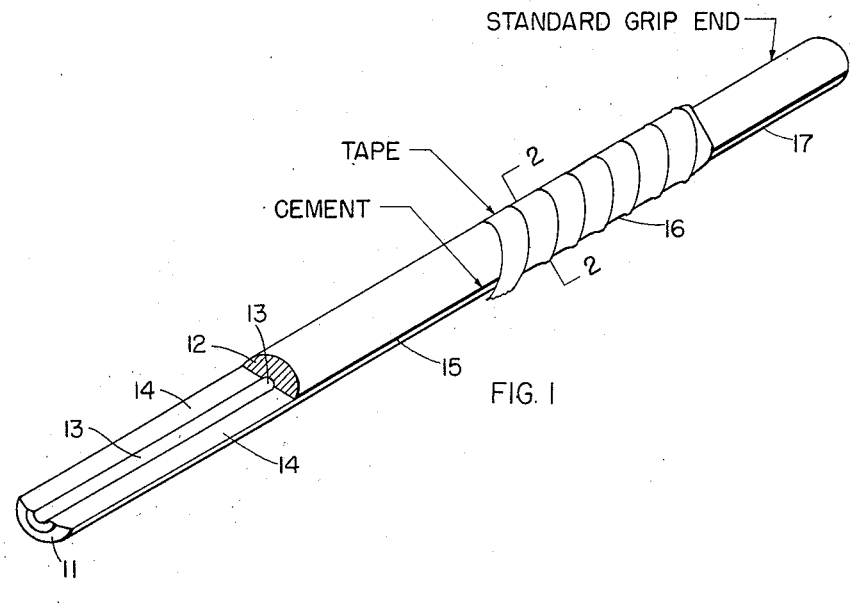
Fig. 1 is a perspective view, partly broken away, of an electrode according to a preferred embodiment of the invention.
Figure 3:
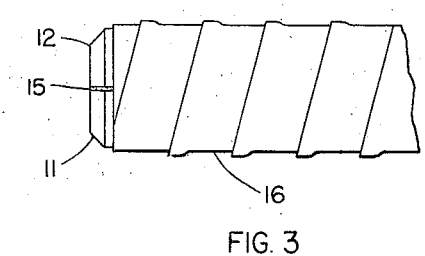
Fig. 3 is a front elevation of a portion of the tip end of the electrode of Fig. 1, somewhat enlarged.
Figure 2:
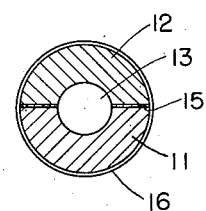
Fig. 2 is a sectional view, somewhat enlarged, of the electrode of Fig. 1, taken along line 2—2.

Referring now to the drawings, wherein like reference characters designate like parts throughout the several views, there is shown in Fig. 1 an electrode generally designated 10, comprising two similar halves 11 and 12, each having a surface 14 matching with the corresponding face of the other half when placed in juxtaposition as in Fig. 1. The surface 14 may be flat or of other configuration to match the mating surface, and is preferably of simple form to facilitate manufacture. The portions 11 and 12 correspond to a single electrode structure which has been split longitudinally throughout the length thereof, preferably at the axial or center line thereof. While the structure is shown as cylindrical it may be of any suitable shape, such as hexagonal, square or as may be convenient.

A hollowed-out portion 13 is provided during casting axially along the electrode by forming a groove in each half of the electrode, the grooves cooperating to form a longitudinal channel for the conduction of a reactant gas such as oxygen, or other chemically active gas, when the halves are assembled as a complete electrode.

Preferred dimensions for an electrode for underwater cutting involve an electrode diameter of about one-half inch, an internal channel diameter of one-eighth inch and an electrode length of six to twelve inches as may be convenient for working in restricted spaces.

It is difficult and expensive to construct by casting or electrical deposition a heavy walled body having a central hole of small dimensions. When the material is too hard for boring it is generally not possible to form a solid bar type of electrode and thereafter produce the internal channel. The present invention provides a cast underwater cutting electrode of a form not previously available.

A further feature of the present invention is illustrated at character 15 which is a cementitious material of refractory character, such as the more refractory of the welding fluxes employed in arc-welding, applied between the halves 11 and 12 whereby they may be cemented together after casting. The application of the cement may be employed to supply a portion of the silicon and aluminum desired for protecting the arc once it has been formed. Accordingly the cement may have silicon and aluminum therein and either or both halves may be dipped in a molten slag of melting point slightly below that of the electrodes. The halves may thereupon be laid together or clamped to cement the portions in their final position upon cooling of the slag. Alternatively, other cementing means may be employed or the electrode halves may be held together and the assembly then dipped in a molten cement or flux material to thereby bind the electrode into a unitary structure.

The electrode is then preferably covered with a wrapping material such as glass cloth tape, masking tape, or the like, to provide electrical insulation and to further bind the sections together. With suitable binding technique being employed it is not essential that the halves be cemented together.

At the torch end of the electrode there is provided an uncovered portion, preferably round, and conveniently of smaller diameter as shown at 17, the round portion being provided of correct size for easy insertion in, and clamping by, the standard electrode holder or torch. This is of importance especially in conditions where the operator works "blind" or in circumstances preventing full vision and maneuverability.

It has been found by experience that simple cast iron electrodes are not generally satisfactory for underwater cutting operations, sharing with tubular steel electrodes a very short life, e. g., one minute for a length of fourteen inches. It has been discovered that the presence of silicon in the cast iron in sufficient quantity reduces the electrode oxidation rate very substantially and multiplies its useful life as much as three to four times even when used in the convenient eight inch electrode-lengths. The silicon content is comparatively high, from twelve to fourteen percent is very satisfactory but slightly higher content of silicon, fourteen and one-half percent, is also very satisfactory.

The addition of aluminum to the cast iron and silicon alloy is also desirable in cases where the casting process for making the electrode is such that dissolved oxygen remains in the melt. In such cases aluminum should be added to the melt to a maximum of up to five percent or slightly less, but from about one to three and one-half percent is preferred for consistently satisfactory electrodes.

The silicon and the aluminum in the cast iron electrode retard the melting rate of the electrode as compared to an electrode without the silicon and without silicon and aluminum. Apparently, the silicon and aluminum are effective in the formation of a protective slag which is highly refractive. A slag forms in the cup of the arc tions of the electrode, thereby slowing down consumption of the electrode. A cast iron electrode containing silicon and aluminum has an electrode-consumption rate of about twenty-five percent less than a similar electrode without the aluminum.

Aluminum is further desirable because it adversely affects the brittleness of the electrode; but a cast iron electrode containing fourteen and one-half percent silicon was found to be somewhat to brittle for practicable use when it also had five percent aluminum. Larger percentages of silicon and aluminum make the alloy too brittle for the underwater cutting use and too difficult to cast in straight smooth form.

It is preferable that the electrode be electrically insulated except at the holder portion 17. This may be accomplished by dipping the assembled electrode in a laquer or resin both or by wrapping with insulating tape, cloth or the like, or by a combination thereof.

While the invention is described with respect to a preferred embodiment of the invention various modifications may obviously be resorted to by those skilled in the electrode art without departing from the spirit and scope of the invention as hereinafter defined by the appended claims.

What is claimed is:

1. A composite arc-oxygen cutting electrode comprising two similar elongated sections of a cast iron alloy containing from substantially one-half of one percent up to substantially five percent of aluminum and from substantially twelve to fourteen percent of silicon, said sections having complementary surfaces axially therealong each with a hollowed-out axial groove constructed and arranged to form a unitary elongated member with an oxygen-conducting central bore therein when fitted together as an electrode, said silicon and aluminum being proportioned to form a refractory slag about the electrode end as the arc is operated to thereby reduce the melting rate of the electrode and prolong its life in cutting.

2. The composite electrode of claim 1 having at one end thereof, when assembled with said complementary faces in juxtaposition, a cylindrical form for a substantial portion of the length thereof constructed and arranged for fitting into a cylindrical electrode holder.

3. The electrode of claim 2 wherein the two sections thereof are assembled and thereafter coated with a refractory cement binding said sections into a unitary structure.

4. A composite hollow arc-oxygen cutting electrode of alloy cast iron containing from substantially one-half of one percent up to substantially five percent of aluminum and substantially twelve to fourteen percent of silicon, the electrode comprising two half-cylinders cemented in juxtaposition to form a cylinder, each said half having an axially extending groove therealong for conduction of gas to the working end thereof, and said cylinder having thereabout a covering of insulating tape binding said halves together, said silicon and aluminum being proportioned to form a refractory slag about the cutting end of the electrode as the arc is operated to thereby reduce the melting rate of the electrode and prolong its life in cutting.

5. The electrode of claim 4 wherein said cement is a refractory slag material of melting point lower than the melting point of said alloy.

6. An electrode for arc-oxygen cutting, comprising a hollow elongated structure of cast iron alloy containing from twelve to fourteen percent of silicon and substantially five percent of aluminum, said silicon and aluminum being proportioned to form a refractory slag about the cutting end of the electrode as the arc is operated to thereby reduce the melting rate of the electrode and prolong its life in cutting.

7. A metallic electrode for arc-oxygen underwater cutting comprising a hollow elongated structure, said structure comprising a tubular portion consisting essentially of a cast iron alloy containing about twelve to fourteen percent silicon, said silicon being proportioned to form a refractory slag about the cutting end of the electrode as the arc is operated to thereby reduce the melting rate of the electrode and prolong its life in cutting.

8. A metallic electrode as defined in claim 7 but further characterized by said alloy containing aluminum from substantially one-half of one percent up to five percent.

9. A metallic underwater cutting electrode of a type described comprising a hollow elongated structure comprising a tubular portion consisting essentially of a cast iron alloy containing silicon in a range of from twelve to fourteen and one-half percent, and aluminum in a range of from one to three and one-half percent, said silicon and aluminum being proportioned to form a refractory slag about the cutting end of the electrode as the arc is operated to thereby reduce the melting rate of the electrode and prolong its life in cutting.

10. An electrode as defined in claim 9 but further characterized by said tubular portion comprising two similar elongated sections having complementary surfaces axially therealong.

11. The electrode of claim 3 wherein the refractory cement supplies at least a portion of the aluminum and silicon.

References Cited in the file of this patent

UNITED STATES PATENTS

| | | |
|---|---|---|
| 2,083,309 | Applegate | June 8, 1937 |
| 2,410,461 | Ronay | Nov. 5, 1946 |
| 2,510,960 | Danhier | June 13, 1950 |

FOREIGN PATENTS

| | | |
|---|---|---|
| 414,657 | Great Britain | Aug. 7, 1934 |

OTHER REFERENCES

Alloys of Iron and Silicon by Guenir, March and Stoughton, published by McGraw-Hill Book Co., Inc., 1933, paragraph 159 on page 314.

U. S. Navy Developments in Underwater Cutting by Ronay et al. Reprinted from the Journal of American Society of Naval Eng. vol. 57, #4, November 1945, pp. 467–473.